United States Patent [19]
Morozov et al.

[11] Patent Number: 5,315,843
[45] Date of Patent: May 31, 1994

[54] EVAPORATIVE AIR CONDITIONER UNIT

[75] Inventors: Victor A. Morozov; Serguei P. Kanachine; Louri I. Krasnochtchekov; Alexandre I. Makienko; Valentine A. Matveev; Valeri G. Khriachtchev, all of Moscow, U.S.S.R.; Poi-Sik Tan, Singapore, Singapore

[73] Assignee: ACMA Limited, Singapore, Singapore

[21] Appl. No.: 929,248

[22] Filed: Aug. 13, 1992

[51] Int. Cl.$^5$ .............................................. F28D 9/02
[52] U.S. Cl. ........................................ 62/309; 62/314
[58] Field of Search ................. 62/304, 309, 314, 315, 62/121

[56] References Cited

U.S. PATENT DOCUMENTS

| | | | |
|---|---|---|---|
| 1,904,686 | 4/1933 | Humphreys | 62/309 |
| 4,854,129 | 8/1989 | Hickley et al. | 62/304 |
| 4,976,113 | 12/1990 | Gershuni et al. | 62/314 |
| 4,977,753 | 12/1990 | Maisotsenko et al. | 62/121 |
| 5,050,391 | 9/1991 | Tsimerman | 62/94 |
| 5,187,946 | 2/1993 | Rotenberg et al. | 62/314 |

FOREIGN PATENT DOCUMENTS 1109559  8/1984  U.S.S.R. ............................. 62/309

Primary Examiner—Henry A. Bennet
Assistant Examiner—William C. Doerrler
Attorney, Agent, or Firm—D'Alessandro, Frazzini & Ritchie

[57] ABSTRACT

A self-contained air conditioner unit comprises an enclosure including a first intake aperture positioned to communicate with outside ambient air and a first outlet aperture positioned to communicate with a habitable space in which the air conditioner is placed, and a second intake aperture positioned to communicate with a habitable space in which the air conditioner is placed, and a second outlet aperture positioned to communicate with ambient air outside of the habitable space. A water reservoir is disposed at the bottom of the enclosure. A heat exchanger is disposed in the cabinet over the water reservoir, and comprises a plurality of vertically disposed, alternating wet air channels and dry air channels, the alternating wet air channels and dry air channels defined by substantially parallel opposing heat-transfer partitions. Each of the dry channels communicates with a pre-mixing chamber at intake ends thereof and a diverter at outlet ends thereof, and each of the wet channels communicates with the diverter at intake ends thereof and the second outlet aperture at outlet ends thereof. A wet partition comprising a capillary porous material is disposed in each of the wet channels, each wet partition oriented substantially parallel to the opposing heat transfer partitions and positioned so as to substantially bisect the volume of the wet channel in which it is disposed. Each of said wet partitions extends into the water reservoir and immersed in a volume of water contained therein. Air moving means, such as a blower, are provided for moving a volume of air from the first and second intake apertures through the dry channels and for moving air between the wet channels and the second outlet aperture.

8 Claims, 3 Drawing Sheets

EVAPORATIVE AIR CONDITIONER UNIT

BACKGROUND OF THE INVENTION

1. Field of the Invention

The present invention relates to devices and systems for ventilation and cooling of air within a single confined habitable space. More particularly, the present invention relates to a self-contained air conditioner unit suitable for cooling a confined habitable space.

2. The Prior Art

Evaporative coolers are well known in the art. So-called "swamp coolers" utilize the thermodynamic principle of adiabatic saturation. The air to be cooled is saturated with a water mist, whose evaporation from the liquid state (mist) to vapor state takes up available heat energy from the air itself, thus lowering its temperature. In this method of direct evaporative cooling, the ambient air may be cooled in the limit to its wet bulb temperature, also known as the adiabatic saturation temperature. Except in very dry climates direct evaporative cooling is unsuitable for sustained cooling of a confined habitable space because continuous humidification of the air causes discomfort to occupants.

There also exist in the art various methods of indirect evaporative cooling, in which an airstream is first cooled by adiabatic saturation, and then used to cool a separate, non-mixing airstream across a heat-transfer partition. The latter airstream is said to be sensibly cooled; that is, cooled without altering its absolute moisture content. Such methods enable continuous cooling and recirculation of the air within a confined habitable space without the uncomfortable effects of increasing humidity.

Additionally, the prior art includes methods of pre-cooling an intake airstream before adiabatic saturation cooling, thereby enabling the airstream to be cooled below the wet bulb temperature corresponding to its initial intake conditions. In the limit, the intake airstream can be cooled to the dew point corresponding to its initial intake conditions. With relatively dry ambient conditions at intake, that is, when the ambient relative humidity is less than 40%, the dew point may be up to 10° C. (degrees Celsius) below the corresponding wet bulb temperature. These methods increase the cooling capacity of the intake airstream, thus imparting a greater degree of sensible cooling to the aforementioned second airstream recirculated to and from the habitable space.

The prior art described above suffers various deficiencies in its application to air conditioning equipment for space cooling. Some of these deficiencies are described in the following paragraphs.

In some current systems, ambient air at intake is blown directly through wet channels, and thereby cooled by adiabatic saturation (either through application of a water mist, spray, or from wetted porous material within the channel). The wet channels are arranged in alternate sequence to an equal number of dry channels, through which a separate, non-mixing flow of room air is directed in a counter-flow or cross flow direction. This latter flow of recirculating room air is sensibly cooled by heat transfer across the partitions forming the alternative wet and dry channels.

The major deficiency of such systems is that since no pre-cooling is effected on the intake airstream prior to adiabatic saturation, the intake airstream can only be cooled, at the limit, to the wet bulb temperature corresponding to its condition at intake. This in turn limits its capacity to cool the secondary airstream flowing in the alternate dry channels. To overcome this deficiency, a majority of such systems require auxiliary methods of dehumidifying the intake ambient airstream prior to passage into the wet channels, thereby depressing its wet bulb temperature and increasing its usable cooling capacity. The most common methods of continuous-flow, regenerative-cycle air dehumidification utilize chemical agents such Lithium Bromide or Lithium Chloride, and are well known in the art. Invariably, such dehumidification plant is more bulky and costly than the cooling apparatus itself, and therefore imposes yet another shortcoming in the present state of the art.

Other systems in the prior art pre-cool the intake airstream by diverting a portion of the pre-cooled airstream into counter-flow wet channels arranged in alternate order with the intake channels. Such arrangements enable the first airstream to be cooled, in the limit, to the dew point corresponding its intake conditions, thereby increasing its usable cooling capacity. Since the portion diverted into the pre-cooling wet channels may be required to be as high as 50% of the original intake stream, adequate flow area must be provided in the wet channels for the moist airstream. Consequently, such systems suffer the design tradeoff between two detrimental factors; (i) wider channels impair heat transfer between the alternate airstreams and (ii) narrower channels cause significantly increased flow resistance in the wet stream, thereby increasing power demand in the fan blowers.

Most indirect evaporative cooling systems in the prior art draw intake air entirely from the outdoor ambient environment. When operating in extremely hot climatic conditions, for example, when the outside ambient dry bulb temperature exceeds 35° C., such an arrangement imposes an extreme load in pre-cooling in intake airstream. To achieve the necessary degree of pre-cooling, the portion of the intake stream diverted into the wet channels in the counter-flow direction may exceed 50% of the original intake stream. This pre-cooling load accordingly reduces the available cooling capacity for the habitable space. Under extremely hot ambient outdoor conditions, many current systems suffer a serious decline in performance.

Yet another deficiency in current indirect evaporative cooling systems rests in the type and placement of lining material affixed to the partition walls of the wet channels. Optimal heat transfer across the partitions between the wet and dry channels would be achieved in the absence of any lining material. However it is necessary to maintain a supply of water uniformly distributed across the surfaces of the wet channel walls in order to facilitate adiabatic saturation. In the present state of the art, this is achieved through the use of absorbent capillary porous material affixed to the wet side of each partition. This material serves to distribute and retain the water introduced into the wet channels either by a mist, drip, or wicking arrangement. Consequently, the majority of current systems suffer a design tradeoff between two detrimental factors: (i) capillary porous material insulates the heat transfer surfaces, thereby impeding heat transfer, (ii) an absence of material results in inadequate water distribution across the surfaces, making evaporative saturation difficult to achieve. As a compromise between the aforementioned factors, some current designs utilize material arrayed in an alternating pattern on the wet side of each partition surface.

BRIEF DESCRIPTION OF THE INVENTION

According to a first aspect of the present invention, a self-contained air conditioner unit comprises an enclosure including a first intake aperture positioned to communicate with the ambient outside air and a first outlet aperture positioned to communicate with a habitable space in which the air conditioner is placed, and a second intake aperture positioned to communicate with the habitable space in which the air conditioner is placed and a second outlet aperture positioned to communicate with ambient air outside of the habitable space. A water reservoir is disposed at the bottom of the enclosure.

A heat exchanger is disposed in the cabinet over the water reservoir, and comprises a plurality of vertically disposed, alternating wet air channels and dry air channels, the alternating wet air channels and dry air channels defined by substantially parallel opposing heat-transfer partitions. Each of the dry channels communicates with a premixing chamber at an intake end thereof and a diverter at an outlet end thereof. The diverter communicates with the first outlet aperture and the intake ends of each of the wet channels. The diverter diverts a primary air stream portion of the air volume output of the dry channels to the habitable space and a secondary air stream portion of the output air of the dry channels to the intake ends of each of the wet channels. The outlet end of each of the wet channels communicates with the second outlet aperture at outlet ends thereof.

A wet partition comprising a capillary porous material is disposed in each of the wet channels, each wet partition oriented substantially parallel to the opposing heat transfer partitions and positioned so as to substantially bisect the volume of the wet channel in which it is disposed. Each of said wet partitions extends into the water reservoir and immersed in a volume of water contained therein.

Air moving means are provided for forcing air from the first and second intake apertures in a selected ratio to the premixing chamber and through the dry channels to the diverter and to the first outlet aperture and the second outlet aperture through the wet channels. As presently preferred, the air moving means may constitute a first blower communicating with the first and second intake apertures and the premixing chamber and a second blower communicating with the outlet ends of the wet channels and the second outlet aperture.

The dimensions of the wet and dry channels and the air velocity through the channels are chosen to produce substantially laminar air flow through the channels and to avoid turbulent air flow across the surfaces.

According to a second aspect of the present invention, means are provided for adjusting the mixing proportion (hereinafter referred to as the "pre mixing ratio") or air drawn from the outdoor ambient environment, and air drawn from the habitable space, prior to passage of the intake air mixture into the dry channels of the heat exchanger.

According to a third aspect of the present invention, means are provided for adjusting the relative proportion of the primary and secondary air streams diverted from the air volume output of the dry channels (hereinafter referred to as "diversion ratio").

According to a fourth aspect of the present invention, the wet partitions are constructed from capillary-porous non-absorbent hydrophobic material, which may be impregnated with a hydrophilic surface agent, the combination of material and surface agent selected to impart wetting and vertical transport (wicking) properties to the necessary height above the water immersion surface.

Since the capillary-porous partitions are fabricated from a hydrophobic material, they have stable physical and chemical characteristics under contact with water, while treating the surfaces of the partitions with hydrophilic agents makes possible capillary moisture transport to the required height of the capillary-porous partitions.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
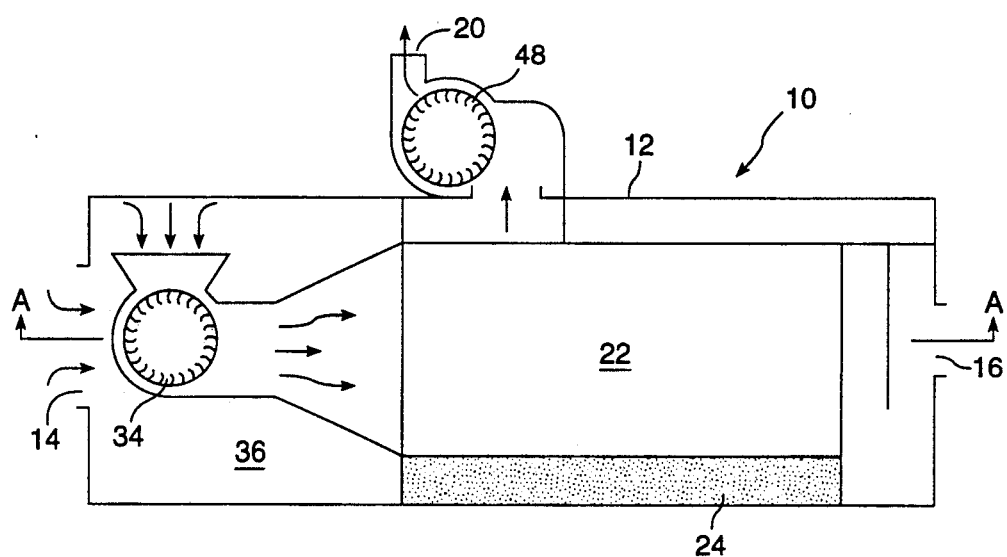
FIG. 1 is a side view of an apparatus for indirect-evaporative air cooling according to the present invention.
Figure 2:
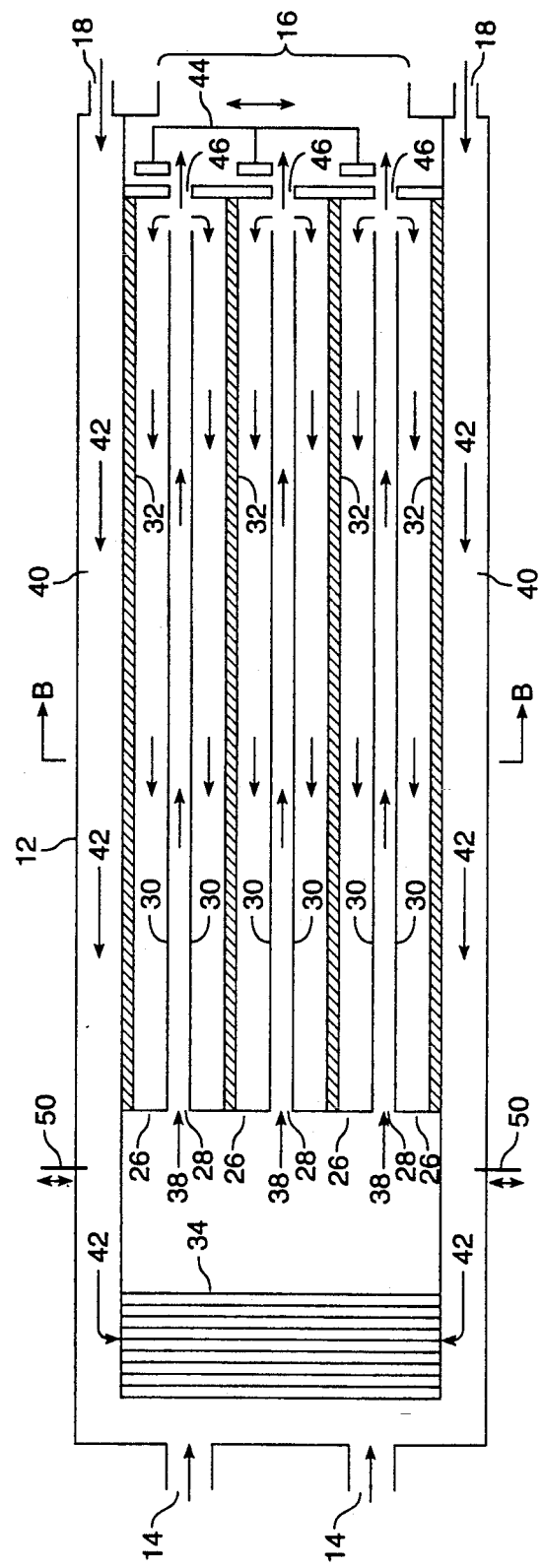
FIG. 2 is a cross-sectional view of the indirect-evaporative air cooling apparatus of FIG. 1 taken along the line A—A.
Figure 3A:
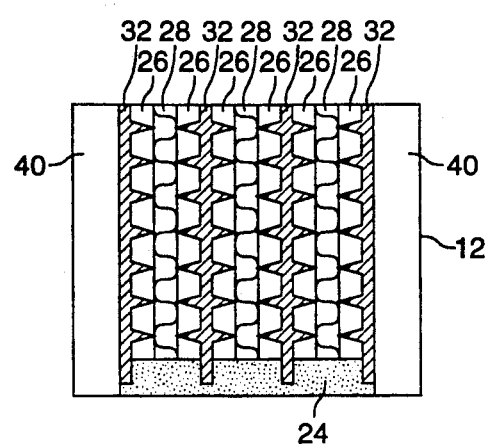
FIG. 3a is a cross-sectional view of the indirect-evaporative air cooling apparatus of FIGS. 1 and 2 taken along the line B—B of FIG. 2.

Referring to FIGS. 1–3a, side, top cross-sectional, and end-cross-sectional views of a presently preferred embodiment of an indirect-evaporative air conditioning unit according to the present invention are shown. The cross-sectional view comprising FIG. 2 is taken along the lines A—A in FIG. 1, and the cross-sectional view of FIG. 3a is taken along the lines B—B in FIG. 2.

The air conditioning unit 10 of the present invention is housed within an appropriate enclosure 12. Enclosure 12 is equipped with at least one first intake aperture 14 for supplying outside ambient air to the air conditioner unit. Two are shown. First intake aperture 14 is located at a position on the enclosure 12 which communicates with the outside ambient environment when enclosure 12 is appropriately mounted to cool a habitable space.

A first outlet aperture 16 is provided for supplying cooled air to the habitable space. Outlet aperture 16 is located at a position on the enclosure 12 which communicates with the habitable space to be cooled when enclosure 12 is appropriately mounted between the habitable space and the outside ambient environment.

At least one second intake aperture 18 is provided for returning cooled air to the air conditioner unit from the habitable space. Two are shown. Second intake apertures 18 are located at a position on the enclosure 12 which communicates with the habitable space to be cooled when enclosure 12 is appropriately mounted to cool the habitable space.

A second outlet aperture 20 is provided for returning air to the outside ambient environment. Second outlet aperture 20 is located at a position on the enclosure 12 which communicates with the outside ambient environment when enclosure 12 is appropriately mounted between the habitable space and the outside ambient environment.

A heat-exchanger unit 22 is disposed inside enclosure 12 above a water reservoir 24. Heat exchanger unit 22 comprises alternating vertically-oriented wet channels 26 and dry channels 28. Wet channels 26 and dry channels 28 are separated from one another by vertical heat-exchanging partitions 30. One side of each heat-exchanging partition 30 forms a wall of a wet channel 26 and the other side of each heat-exchanging partition 30 forms the wall of a dry channel 28. Heat-exchanging partitions 30 may comprise a material such as aluminum, polyethylene or PVC.

A wet partition 32 comprising a sheet of capillary porous material is disposed in each of wet channels 30. Each wet partition 32 is oriented substantially parallel to the heat-exchanging partitions 30 and is positioned so as to substantially bisect the volume of the wet channel in which it is disposed. Those of ordinary skill in the art will appreciate that adequate support members are to be provided to assure that the wet partitions are maintained in their desired positions under the air flow conditions encountered in the wet channels.

Each of wet partitions 32 extends into the water reservoir 24 and is immersed in a volume of water contained therein. According to a presently preferred embodiment of the invention, wet partitions 32 may comprise a material such as porous polyethylene or porous PVC, and may be impregnated with a known hydrophilic surface agent.

A first blower 34 communicates with first intake aperture 14 and functions to force air from the outside environment through a premixing chamber 36 and then through dry channels 28 as shown by arrows 38. As the air passes through dry channels 28, it is cooled by giving up some of its heat to heat-exchanging partitions 30. First blower 34 also communicates with second intake apertures 18 from which it draws return air from the habitable space through plenums 40 as shown by arrows 42. After the air from mixing chamber 36 passes through dry channels 28, it encounters a diverter, preferably comprising a slotted adjustable diversion plate 44. The slot spacing matches the spacing of apertures 46, through which a primary air stream portion of the cooled air passes and is directed to first outlet aperture 16 into the habitable space.

A secondary stream portion of the cooled air which passed through dry channels 28 is deflected by the surfaces adjoining apertures 46 (and surface of slidable diversion plate 44) and is directed into wet channels 26. This air is drawn through wet channels 26 by the action of second blower 48 and passes across the surfaces of wet partitions 32 where it loses heat by causing evaporation of some of the moisture drawn up from reservoir 24 by capillary action and contained on the surfaces of wet partitions 32. This air extracts heat from the wet channel surfaces of heat-exchanging partitions 30. The moisture-laden air which has passed through wet channels 26 is transferred to the outside environment through second outlet aperture 20. A second blower 48 may optionally be used to perform this function.

Means are provided to adjust the pre-mixing ration and the diversion ratio. The premixing ratio may be controlled by means such as a slidable barrier 50 positioned in each of plenums 40 such that they may be adjusted to partially restrict the flow of return air from the habitable space to first blower 34. According to a presently preferred embodiment of the invention, the premixing ratio of outside air and return air from the habitable space should be from between about 1:0 to about 1:3.

The diversion ratio may be controlled by adjusting the position of slidable diversion plate 44 to cover a selected portion of apertures 46. According to a presently preferred embodiment of the invention, the diversion ratio of the primary stream of cool air allowed to flow into the habitable space and the secondary stream diverted into the wet channels should be from about between 1:1 to about 3:1.

According to a presently preferred embodiment of the invention, the widths of the wet and dry channels and the air-flow rates through the channels are chosen to produce substantially laminar air flow across the heat-exchange partitions and to substantially avoid turbulent air flow across those surfaces so as to achieve minimum flow resistance. For example, in an embodiment built according to the principles of the present invention, the dry channels have widths between about 1.0 to 2.5 mm and the wet channels have widths measured between one heat-exchanging partition and the wet partition of about half that of the dry channels. The flow rate in the dry channels should be between about 2 to 5 meters/sec, with a Reynolds number of less than 2,000 based on the widths of the dry channels.

Figure 3B:
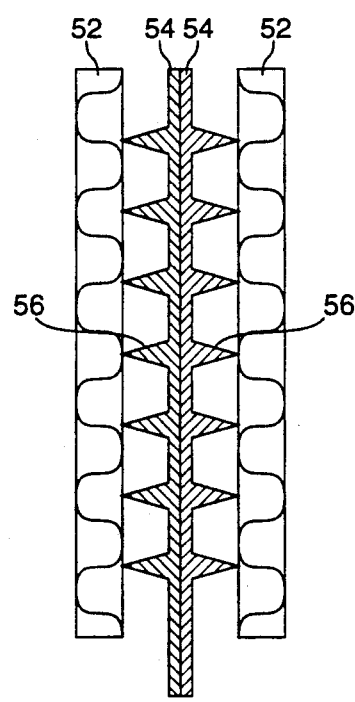
FIG. 3b is a detailed cross sectional view of as portion of the indirect-evaporative air cooling apparatus of FIGS 3a, showing a presently preferred structural detail.

Referring now to FIG. 3b, a detailed cross sectional view of a portion of the apparatus of FIG. 3a fabricated according to a presently preferred embodiment of the invention is shown. Each of the dry channels may comprise a section of corrugated laminated PVC material 52 known as "impraboard" having internal longitudinal channels of about 2 mm by 4 mm in section. The wet channels disposed between pairs of dry channels may comprise back to back sheets of cast porous polyethylene or PVC foam material 54 having ribs 56 for structural support.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A self-contained air conditioner unit comprising:
   an enclosure, said enclosure including a first intake aperture oriented to communicate with outside ambient air and first outlet aperture positioned to communicate with a habitable space in which said air conditioner is placed, and a second intake aperture positioned to communicate with a habitable space and a second outlet aperture positioned to communicate with ambient air outside of said habitable space;
   a water reservoir disposed at the bottom of said enclosure;
   a premixing chamber for premixing air from said first and said second intake apertures;
   a heat exchanger disposed in said cabinet over said water reservoir, said heat exchanger comprising a plurality of vertically disposed, alternating wet air channels and dry air channels each having intake and outlet ends, said intake ends of said wet channels being located proximate to said exhaust ends of said dry channels, and said outlet ends of said wet channels being located proximate to said intake ends of said dry channels, said alternating wet air channels and dry air channels defined by substantially parallel and planar opposing heat-exchanging surfaces, each of said dry channels communicating with said premixing chamber at said intake ends thereof, and each of said wet channels communicating said second outlet aperture at said outlet ends thereof;

diverting means disposed at said outlet ends of each of said dry channels for diverting a primary stream portion of air from each of said dry channels to said first outlet aperture and a secondary stream portion of air from each of said dry channels to each of said wet channels at said intake ends thereof such that air flowing through said wet channels and said dry channels is in a counterflow relationship;

a wet partition comprising a capillary porous material disposed in each of said wet channels, each wet partition disposed in a plane substantially parallel to said opposing heat-exchanging surfaces and positioned so as to substantially bisect the volume of said wet channel in which it is disposed, each of said wet partitions extending into said water reservoir and immersed in a volume of water contained therein;

air moving means for forcing a volume of air from said first and second intake apertures, through said premixing chamber and said dry channels, to said diverting means, and from said intake ends of said wet channels to said second outlet aperture;

wherein the cross sectional areas of the wet and dry channels and the air moving means are selected so as to provide air flow velocities which promote laminar air flow and to substantially eliminate turbulent air flow.

2. The air conditioner of claim 1, further including premixing means for adjusting the proportion of air drawn from said first and second intake apertures.

3. The air conditioner of claim 2, wherein said premixing means is capable of adjusting the proportion of air drawn from said first and second intake apertures from about 1:0 to about 1:3.

4. The air conditioner of claim 1 wherein said diverting means further includes means for varying the relative volumes of said primary stream portion and said secondary stream portion of air from said dry channels.

5. The air conditioner of claim 4 wherein said means for varying may vary said first and second portions in volume ratios of from between about 1:1 and 3:1.

6. The air conditioner of claim 1 wherein said wet partitions are impregnated with a hydrophilic surface agent.

7. The air conditioner of claim 1 wherein said air moving means comprises a first blower for forcing air from said first and second intake apertures, through said premixing chamber and said dry channels, to said diverting means, and a second blower for forcing air through said wet channels from said intake ends thereof to said second outlet aperture.

8. The air conditioner of claim 1 wherein the cross sectional areas of the wet and dry channels and the air moving means are selected so as to provide air flow velocities which promote laminar air flow with a Reynolds number below 2,000 based on the width of said wet and dry channels.

* * * * *